Patented Dec. 1, 1936

2,062,962

UNITED STATES PATENT OFFICE 2,062,962

INSULATING CASTING

Henry N. Baumann, Jr., and John P. Swentzel, Niagara Falls, N. Y., and Ian M. Logan, Niagara Falls, Ontario, Canada, assignors to The Carborundum Company, Niagara Falls, N. Y., a corporation of Pennsylvania No Drawing. Application September 10, 1935, Serial No. 40,004

5 Claims. (Cl. 49—79)

This invention relates to improvements in refractory materials and particularly to the production of cast refractory pieces possessing outstanding ability to resist molten caustic or alkaline fluxes. Such pieces are of great utility in the construction of furnaces in which the walls are subjected to erosion by alkalies or other basic substances, and are also of value in the electrolysis of fused caustics and the like, since in addition to their chemical stability they possess a high degree of electrical resistance which permits localization of electrolytic effects to a degree which is not possible with iron or other metal parts and which is impractical with ordinary insulating porcelains and refractories because of the rapidity of corrosion by the fused caustic.

Prior to the present discovery, many substances have been tried in this art with disheartening results in an effort to find a material suitable for use in contact with molten alkalies. These have included the usual bonded ceramic materials and various others. The former promptly disintegrated and fell to pieces upon continued immersion in molten sodium hydroxide at 1000° F. So likewise did electrically fused alumina and fused chromite. Fused mullite was eaten away and fused magnesia seriously attacked.

Despite the fact however that both fused alumina and fused magnesia when taken separately are unsatisfactory, mixtures of the two when fused together and cast into blocks were found to possess excellent ability to resist the caustic attack. Particularly favorable results were secured with pieces composed of roughly half magnesia and half alumina by weight, corresponding approximately to the eutectic between magnesia and magnesia spinel, (45% magnesia, 55% alumina). Such pieces showed a loss of weight of less than 1% after treatment in molten sodium hydroxide for two weeks at 1000° F. and retained sharp corners and edges perfectly throughout this soaking treatment.

Other mixtures of alumina and magnesia falling between spinel and magnesia in composition also show comparatively good resistance to caustic. Mixtures containing 70% MgO and 30% $Al_2O_3$ resist molten caustic but are so refractory as to be very difficult to cast into satisfactory blocks. 60% MgO and 40% $Al_2O_3$ can however be cast readily and shows even better resistance to molten alkalies. The caustic resistance decreases slowly as the percentage of alumina is increased above 50% but remains much better than with any other known materials well up toward the spinel composition (28% MgO, 72% $Al_2O_3$). The resistance is however best when the refractory is composed principally of the spinel-magnesia eutectic with or without additional magnesia (periclase).

It is essential for best results that the ingredients be relatively pure magnesia and alumina. The presence of as litle as 5% of silica materially increases the rate of corrosion and the presence of 10% of calcium oxide causes rapid complete disintegration by alkaline fluxes.

In the fabrication of refractories of the type described, the magnesia and alumina should be dried and preferably premixed before charging into the furnace, although good results can also be secured by first melting the alumina and then adding magnesia. Any of several commercial ores of these materials can be used if low in lime by taking suitable precautions during furnacing to reduce out such metals as iron and silica by use of carbon. It is of course desirable that substantially pure ingredients be used when economically feasible however, since as previously noted it is important that the resultant product be as free as possible from materials other than alumina and magnesia.

The furnace used and the furnacing operation are quite similar to those familiar to all producers of fused alumina abrasives, the only difference being that the voltage required is somewhat lower and that there is considerable tendency toward volatilization of a portion of the magnesia, so that extra ventilation should be provided and excessively slow melts avoided.

When the bath is thoroughly molten and any metallics have had opportunity to settle, the melt is poured into suitable molds of sand or mild steel by tilting the furnace. The castings thus produced should be cooled slowly enough to prevent cracking. This may be done in any of several ways, such as covering with insulating powder, cooling in a furnace, etc. The blocks poured in this manner are monolithic and will be herein called "cast refractories", this meaning of that term being understood rather than pieces made by slip casting.

Caution should be exercised to prevent the refractories becoming wet in the course of delivery or handling as they are seriously damaged by long contact with hot water and exposure to even cold water is to be avoided.

The refractories may, as noted, be used as insulating members or linings in the electrolysis of caustic fusions or in molten caustic baths for treating materials to remove scale or the like.

Their superior refractoriness permits their use at temperatures above those which cast iron will stand. They are also excellently adapted for use in the lining of sodium sulfide furnaces, sulfate smelters and the like where temperature shock and the presence of water can be avoided. In fact they are quite useful for general refractory service. They should be laid dry and with as little interstitial filler as possible, powdered material of the same sort with a pitch or tar binder being recommended as a cement where such is needed.

Having thus described the production, properties and uses of our refractories, what we desire to secure by claims is:

1. A casting composed of magnesia and alumina in substantially equal proportions by weight.

2. A casting composed principally of the eutectic between magnesia and magnesium aluminate.

3. Apparatus for use in contact with alkaline fluxes, comprising a casting composed substantially of magnesia and alumina in equal parts by weight and substantially free from lime.

4. A casting comprising 30 to 70% magnesia, the remainder being substantially all alumina.

5. A casting composed of magnesia and of the eutectic between magnesia and magnesia spinel.

HENRY N. BAUMANN, Jr.
JOHN P. SWENTZEL.
IAN M. LOGAN.